RING MOUNTED MULTIPLE TUBE OSCILLATOR

Original Filed Nov. 20, 1942

Inventor

ROBERT M. PAGE

By [signature]

Attorney

Patented May 13, 1952

2,596,163

UNITED STATES PATENT OFFICE 2,596,163

RING MOUNTED MULTIPLE TUBE OSCILLATOR

Robert M. Page, Washington, D. C.

Continuation of application Serial No. 466,289, November 20, 1942. This application December 10, 1947, Serial No. 790,753

19 Claims. (Cl. 250—36)

(Granted under the act of March 3, 1883, as amended April 30, 1928; 370 O. G. 757)

This invention is a continuation of my application Serial No. 466,289, filed November 20, 1942, now abandoned, and relates to a multiple tube oscillator having its tubes mounted in a circle with their longitudinal axes extending in mutual parallelism.

In radio frequency apparatus it is sometimes necessary to generate and modulate more power than can be obtained from one or two oscillator tubes.

In apparatus making use of extremely short recurring pulses of high frequency electromagnetic waves it is often necessary to produce such pulses at peak power levels which are unattainable by the use of oscillators employing only one or two oscillator tubes.

In such cases the use of a plurality of oscillator tubes gives rise to numerous difficulties.

The circuit should not require that tubes be matched by special selection. The oscillator should respond faithfully to modulation potentials as does a corresponding one or two tube oscillator. At the high voltages and frequencies at which such oscillators are employed it becomes necessary to maintain leads as short as possible and to provide against spark-over and corona discharge throughout the assembly. In addition, the matching of the impedance of a large number of tubes to that of a transmission line, introduces a further complication. Furthermore, such apparatus is frequently mounted in sea and air borne vessels in which case space and weight considerations are highly important.

It is therefore an object of this invention to provide a multi-tube oscillator which overcomes the above mentioned difficulties.

It is another object to provide a multitube oscillator assembly which is compact and simple in arrangement and which lends itself readily to the coupling of its output circuit to a transmission line through the use of a unitary coupling means.

It is a further object to provide a multitube oscillator in which the leads are short and the tubes closely arranged and yet danger of spark-over and corona is avoided.

It is still another object of the invention to provide a multiple-tube oscillator in which the tubes need not be matched by special selection, and which will respond faithfully to modulation potentials.

Figure 1:
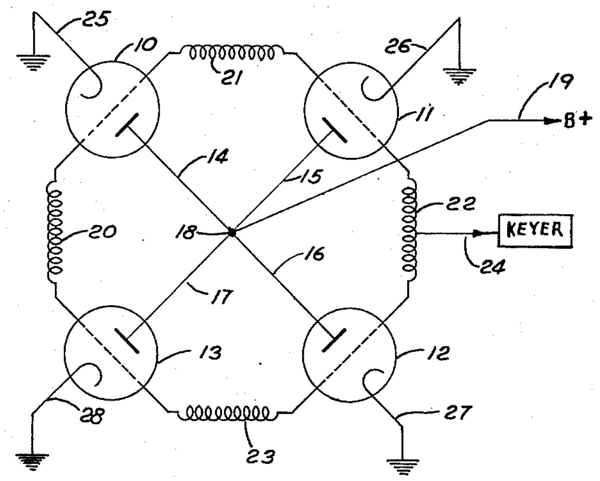
Figure 3:
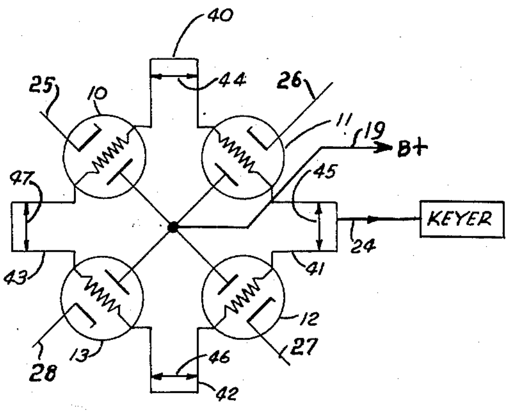
Figure 2:
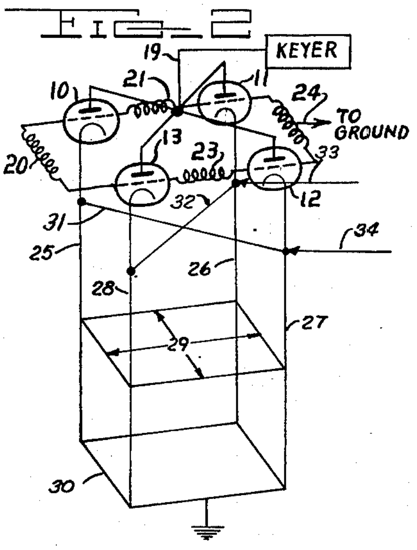

Other objects will become apparent from a careful consideration of the following description when taken together with the accompanying drawing, in which:

Fig. 1 is a schematic circuit diagram of a four tube oscillator embodying the invention, Fig. 2 is a schematic diagram of the output circuit of the oscillator of Fig. 1, and Fig. 3 is a schematic diagram of the grid circuit of the oscillator in a form employing tuned line inductances.

In Fig. 1 are shown four oscillator tubes 10, 11, 12 and 13 positioned to constitute a ring of tubes. While the disclosure is restricted to an oscillator employing four tubes, it should be understood that the arrangement shown and described is applicable to any even number of tubes greater than four.

The anodes of these tubes are shown connected to a common point 18 by leads 14, 15, 16 and 17. In practice the anode short circuiting means is preferably a plate. A conductor 19 connects point 18 to a source of positive high voltage or to a pulser or modulator. The grids are serially connected, with an inductance interposed between the grids of each adjacent pair. The inductances may be in the form of coils as indicated in Fig. 1 by reference numerals 20, 21, 22 and 23, or tuned parallel lines, as shown at 40, 41, 42 and 43 in Fig. 3, may be employed. From the center point of coil 22 in Fig. 1, or tuned line 41 in Fig. 3, a conductor 24 leads to a grid keyer, to a modulator, or if a plate keyer is connected to lead 19 to ground through a resistor which is not shown. Each of the filaments is connected to ground through tuned reactances consisting of conductors indicated at 25, 26, 27 and 28. These conductors constitute a tuned circuit, capacitive in its net reactance, adjustment of which controls oscillator feed-back primarily, having a secondary effect on frequency. The frequency is controlled primarily by the tuning of the grid circuit. For tuning the inductances of Fig. 3, shorting bars 44, 45, 46 and 47 are provided.

The actual physical arrangement of the filament leads is better shown in Fig. 2. In practice these leads are preferably frame rods symmetrically arranged in mutual parallelism, as shown. The leads are all short circuited and grounded by means of a shorting bar schematically indicated at 29. This bar may assume the form of a plate which is slidable for varying the electrical length of the filament frame. An end plate 30 is secured to the ends of the frame rods for supporting purposes.

The frame rods of each diagonally located pair are connected in a plane normal to their axes and located between the filaments and the shorting bar, by a coupling bar such as indicated at 31 and 32. The intent is to divide the frame rods into two unitary sets, each composed of alternately located rods. Thus in an oscillator having six tubes, the filament frame rods will be connected into two unitary sets of three rods each. The load circuit has a connection to each of the two sets at the connecting bar, as illustrated by conductors 33 and 34.

While the disclosure has been confined to one embodiment of the invention, it will be apparent to those skilled in the art that many changes in form and arrangement may be made within the scope of the invention as defined by the appended claims.

The invention described herein may be manufactured and used by or for the Government of the United States of America for governmental purposes without the payment of any royalties thereon or therefor.

I claim:

1. A single-phase oscillator comprising an even number of electronic tubes each having a control grid, and inductance means serially connecting said grids into a closed, direct current conducting ring circuit.

2. A single-phase oscillator comprising an even number of electronic tubes each having a control grid, inductance means serially connecting said grids into a closed, direct current conducting ring circuit and means applying keying impulses to said ring circuit.

3. An oscillator comprising an even number of electronic tubes, each having a control grid, and a plurality of tuned line sections serially connecting said grids into a closed, direct current conducting ring circuit.

4. An oscillator comprising an even number of electronic tubes, each having a control grid, a plurality of tuned line sections serially connecting said grids into a closed, direct current conducting ring circuit, and means applying keying impulses to said ring circuit.

5. An oscillator comprising a plurality of electronic tubes, each having an anode and a control grid, connections of low impedance to energy of the operating frequency between the anodes of all said tubes, and inductance means serially connecting said control grids into a closed, direct current conducting ring circuit.

6. An oscillator comprising a plurality of electronic tubes, each having an anode and a control grid, connections of low impedance to energy of the operating frequency between the anodes of all said tubes, inductance means serially connecting said control grids into a closed, direct current conducting ring circuit and means applying keying impulses to said ring circuit.

7. An oscillator comprising a plurality of electronic tubes, each having an anode and a control grid, connections of low impedance to energy of the operating frequency between the anodes of all said tubes, inductance means serially connecting said control grids into a closed, direct current conducting ring circuit and means applying keying impulses to said tubes.

8. An oscillator comprising a plurality of electronic tubes, each having an anode and a control grid, connections of low impedance to energy of the operating frequency between the anodes of all said tubes, direct current conducting tuned circuit means serially connecting said control grids into a closed, tuned ring circuit, and means applying keying pulses to said tuned circuit.

9. In an oscillator including a keying means, an even number of oscillator tubes mounted in a circular arrangement, each of said tubes including anode, grid and filament electrodes, connections of low impedance to energy of the operating frequency between the anodes of all said tubes, means serially connecting the grids of said tubes, a rigid filament lead extending from the filament of each of said tubes, means constraining said filament leads to extend in mutual parallelism and combining them into a rigid structure, means short circuiting said filament leads in a plane normal to the axes thereof, means connecting said filament leads to the load of said oscillator, and means connecting said grid circuit to said keying means.

10. In an oscillator including a keying means; an even number of oscillator tubes mounted in a circular arrangement, each of said tubes including anode, grid and filament electrodes, connections of low impedance to energy of the operating frequency between the anodes of all said tubes, means serially connecting the grids of said tubes, an inductance forming a part of said connecting means located between each two adjacent grids, a rigid filament lead extending from the filament of each of said tubes, means constraining said filament leads to extend in mutual parallelism and combining said leads into a rigid structure, means short-circuiting said filament leads in a plane normal to the axes of said leads, means conductively connecting said filament leads into two unitary groups, the leads of each group being alternatively located with respect to the leads of the other, means connecting said keying means to said grid circuit and means connecting each of said group of leads to the load of said oscillator.

11. In an oscillator including a keying means, an even number of oscillator tubes mounted in a circular arrangement, each of said tubes including anode, grid and filament electrodes, connections of low impedance to energy of the operating frequency between the anodes of all said tubes, means serially connecting the grids of said tubes, an inductance forming a part of said connecting means located between each two adjacent grids, a rigid filament lead extending from the filament of each of said tubes, means constraining said filament leads to extend in mutual parallelism and combining them into a rigid structure, means short circuiting said filament leads in a plane normal to the axes thereof, means connecting said filament leads to the load of said oscillator, and means connecting said grid circuit to said keying means.

12. In an oscillator including a keying means, an even number of oscillator tubes mounted in a circular arrangement, each of said tubes including anode, grid and filament electrodes, connections of low impedance to energy of the operating frequency between the anodes of all said tubes, means serially connecting the grids of said tubes, a rigid filament lead extending from the filament of each of said tubes, means constraining said filament leads to extend in mutual parallelism and combining them into a rigid structure, means short circuiting said filament leads in a plane normal to the axes thereof, means conductively connecting said filament leads into two unitary groups, the leads of each group being alternatively located with respect to the leads of the other, means connecting said keying means to said grid circuit and means connecting each of said group of leads to the load of said oscillator.

13. In an oscillator including a keying means, an even number of oscillator tubes mounted in a circular arrangement, each of said tubes including anode, grid and filament electrodes, connections of low impedance to energy of the operating frequency between the anodes of all said tubes, means serially connecting the grids of said tubes, a rigid filament lead extending from the filament of each of said tubes, means constraining said filament leads to extend in mutual parallelism and combining them into a rigid structure, means short circuiting said filament leads in a plane normal to the axes thereof, means connecting said filament leads to the lead of said oscillator and means connecting said keying means to the anodes of said tubes.

14. In an oscillator including a keying means; an even number of oscillator tubes mounted in circular arrangement, each of said tubes including anode, grid and filament electrodes, connections of low impedance to energy of the operating frequency between the anodes of all said tubes, means connecting said keying means to said anodes, means serially connecting the grids of said tubes, an inductance forming a part of said connecting means located between each two adjacent grids, a rigid filament lead extending from the filament of each of said tubes, means constraining said filament leads to extend in mutual parallelism and combining said leads into a rigid structure, means short-circuiting said filament leads in a plane normal to the axes of said leads, means conductively connecting said filament leads into two unitary groups, the leads of each group being alternatively located with respect to the leads of the other.

15. In an oscillator including a keying means, an even number of oscillator tubes mounted in a circular arrangement, each of said tubes including anode, grid and filament electrodes, connections of low impedance to energy of the operating frequency between the anodes of all said tubes, means connecting said keying means to said anodes, means serially connecting the grids of said tubes, an inductance forming a part of said connecting means located between each two adjacent grids, a rigid filament lead extending from the filament of each of said tubes, means constraining said filament leads to extend in mutual parallelism and combining them into a rigid structure, means short circuiting said filament leads in a plane normal to the axes thereof, and means connecting said filament leads to the load of said oscillator.

16. In an oscillator including a keying means, an even number of oscillator tubes mounted in a circular arrangement, each of said tubes including anode, grid and filament electrodes, connections of low impedance to energy of the operating frequency between the anodes of all said tubes, means connecting said keying means to said anodes, means serially connecting the grids of said tubes, a rigid filament lead extending from the filament of each of said tubes, means constraining said filament leads to extend in mutual parallelism and combining them into a rigid structure, means short circuiting said filament leads in a plane normal to the axes thereof, means conductively connecting said filament leads into two unitary groups, the leads of each group being alternatively located with respect to the leads of the other, and means connecting each of said groups of leads to the load of said oscillator.

17. A multi-tube generator of radio frequency pulses comprising a plurality of pairs of vacuum tubes arranged symmetrically in a circle, and each having a filament, a grid and an anode, a tuned circuit connected in push-pull relation between the grids of each pair of tubes, a tuned circuit connected in push-pull relation between the filament of each tube of said pair and the filament of an adjacent tube of another pair, and connections of low impedance to energy of the operating frequency between the anodes of all said tubes.

18. A multi-tube generator comprising a plurality of pairs of vacuum tubes arranged in a circle, each of said tubes having a filament, a grid and an anode, tuned circuits between the grids of said pairs of tubes for producing opposite instantaneous polarities on the grids of each pair of tubes, tuned circuits between the filaments of the tubes in different pairs for producing opposite instantaneous polarities on said filaments, connections of low impedance to energy of the operating frequency between the anodes of all of said tubes, and an output circuit coupled to said filament tuned circuits.

19. An oscillator comprising a plurality of tubes mounted in a ring, each of said tubes including plate, grid and filament electrodes, means interconnecting the plates of said tubes, means serially connecting the control grids of said tubes in a continuous circuit, a multi-conductor resonant circuit having a separate conductor for each of said tubes and means coupling said resonant circuit to the filaments of said tubes.

ROBERT M. PAGE.

REFERENCES CITED

The following references are of record in the file of this patent:

UNITED STATES PATENTS

| Number | Name | Date |
|---|---|---|
| 1,934,523 | Brown | Nov. 7, 1933 |
| 2,081,425 | Fay | May 25, 1937 |
| 2,181,568 | Kotowski et al. | Nov. 28, 1939 |
| 2,253,849 | Dow | Aug. 26, 1941 |